T. J. EMERY.

Improvement in Devices for Cutting Off Bolts.

No. 126,384. Patented May 7, 1872.

Witnesses
Saml M. Barton
Jesse J. Wheeler

Inventor
Thomas J. Emery
by his Atty.
Cawrl D. Wright 126,384

UNITED STATES PATENT OFFICE.

THOMAS J. EMERY, OF CHARLESTOWN, MASSACHUSETTS.

IMPROVEMENT IN DEVICES FOR CUTTING OFF BOLTS.

Specification forming part of Letters Patent No. 126,384, dated May 7, 1872.

SPECIFICATION.

Figure 1:
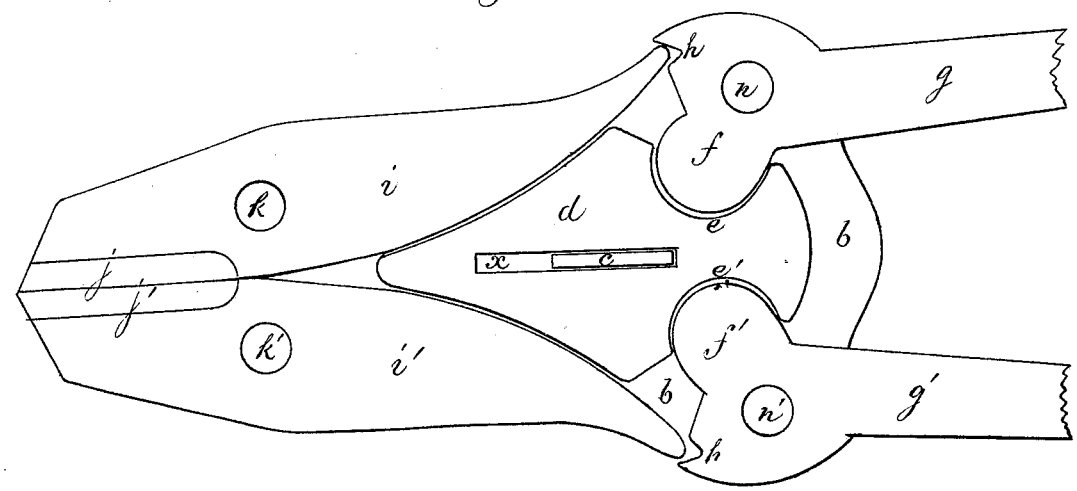
Figure 2:
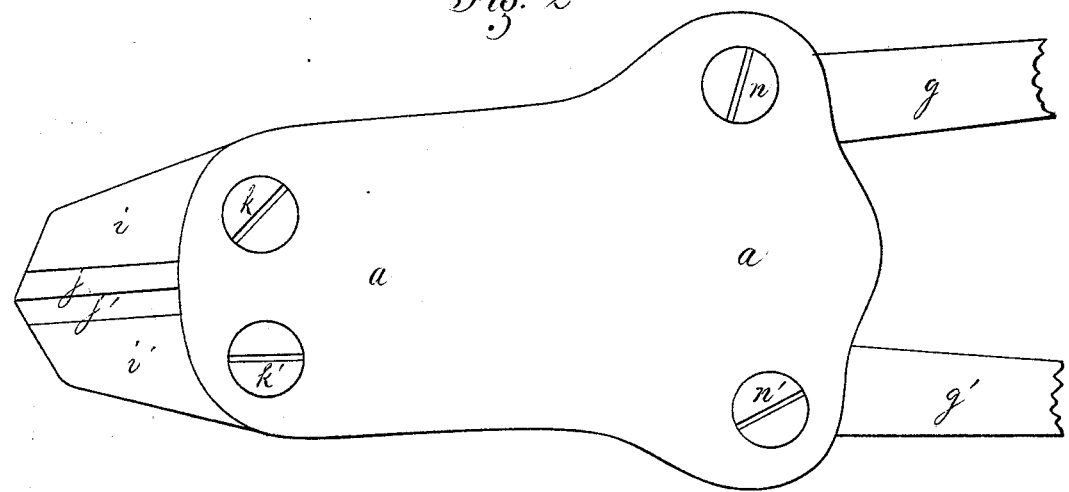

I, THOMAS J. EMERY, of Charlestown, in the county of Middlesex and State of Massachusetts, have invented certain Improvements in Bolt or other Cutter or Shears, of which the following is a specification:

Figure 1 is a front view of my invention with its front shield or case removed, and Fig. 2 is the same with its front shield or case in place.

The present invention relates to an improved implement for cutting bolts, rods, rivets, &c., that is simple and economical, not liable to derangement, easily accessible in order to sharpen or repair any of its several parts, and capable of great power with but little exertion on the part of the operator. My improvements consist in a series of mechanical devices so arranged and operated one with the other, as will be explained in due course, as to cause a peculiar wedge-shaped tongue or plate to be pressed between one end of the jaws or blades of the bolt-cutter or shears in such a manner as to force the said ends apart and at the same time forcibly press together the other or forward ends of the blades or jaws, and readily cut in two the object placed between them.

In the drawing, $a\,a$ represent a curved front shield or case, and $b\,b$ the back curved shield or case of my improved cutter or shears. Attached to the back shield or case $b\,b$ is a longitudinal bar, $c$, traveling on which, longitudinally, is a curved wedge-shaped tongue or plate, $d$, formed in its center with a longitudinal slot, $x$, and at one end with curved recesses $e\,e'$, in which operate cams $f\,f'$ formed on the ends of handles $g\,g'$ that turn on bolts or pivots $n\,n'$, connecting the front and back shields $a\,a\,b\,b$. The cam ends of the handles $g'\,g$ are each curved on the edge, and formed with a notch, $h\,h'$, that receives the ends of curved jaws $i\,i\,i'\,i'$, that turn on bolts or pivots $k\,k'$, that connect the front and back shields $a\,a$ and $b\,b$ at the forward end. The curves of the said jaws $i\,i\,i'\,i'$ are formed, as shown, to admit between them the wedge-shape tongue or plate $d$ and to operate in connection with the notches $h\,h'$. The forward ends of the jaws $i\,i\,i'\,i'$ project beyond the shields $a\,a\,b\,b$, and have ground edges or blades $j\,j'$, between which the bolt or other object to be cut is inserted.

By referring to the drawing it will readily be seen that when the handles $g\,g'$ are extended apart the cams $f\,f'$, acting in the recesses $e\,e'$ of the wedge-shape tongue or plate $d$, causes the latter to be drawn back, and at the same time the notches $h\,h'$ of the handles $g\,g'$, acting on the ends of the jaws $i\,i\,i'\,i'$, cause the other or blade ends of the jaws $i\,i\,i'\,i'$ to open to receive the article desired to be cut. During the above operation the wedge-shaped tongue or plate $d$ is kept closely to the inner curves of the jaws $i\,i\,i'\,i'$, so that when the handles $g\,g'$ are brought together the cams $f\,f'$, acting in the recesses $e\,e'$, and the notches $h\,h'$, operating the ends of the jaws $i\,i\,i'\,i'$, cause the tongue or plate $d$ to be forced in between the curved ends of the jaws $i\,i\,i'\,i'$ so as to press them apart and bring the blades $j\,j'$ of the jaws powerfully together so as to separate the bolt or other article placed between them.

It will be observed that, the handles $g\,g'$ acting as levers upon the end of the tongue or plate $d$, which serves as a wedge between the jaws $i\,i\,i'\,i'$, great power is produced, while but little exertion is needed to operate the handles $g\,g'$, which therefore do not require to be made so long as heretofore, thus economizing the amount of metal used, and being more convenient to operate than when formed as usual.

All the parts of the implement, being strongly made and of simple construction, are not liable to injury; and if by any possibility they should become damaged, by merely unscrewing the bolts or pivots $n\,n'\,k\,k'$ any of the several devices may be easily removed, repaired, and replaced.

Having thus fully described my improvements, what I claim as my invention, and desire to have secured to me by Letters Patent, is—

The combination of the levers $g\,g'$ provided with notches $h\,h'$ and cam-projections $f$, and the wedge-shaped piece $d$, with the levers $i\,i$ and one or more plates, $a$ or $b$, substantially as described.

In testimony whereof I have signed my name to this specification in the presence of two subscribing witnesses.

THOMAS J. EMERY.

Witnesses:
CARROLL D. WRIGHT,
SAML. M. BARTON.